United States Patent
Grey et al.

[15] 3,638,808
[45] Feb. 1, 1972

[54] BALE WAGON

[72] Inventors: Donald M. Grey, Selma; Lee D. Butler, Kingsburg; Jerry W. Welker, Selma, all of Calif.; Jack W. Crane, New Holland, Pa.

[73] Assignee: Sperry-Rand Corporation, New Holland, Pa.

[22] Filed: June 6, 1969

[21] Appl. No.: 870,828

Related U.S. Application Data

[62] Division of Ser. No. 755,141, Aug. 26, 1968, Pat. No. 3,502,230.

[52] U.S. Cl. ..........................214/6 B, 214/8.5 G, 214/508, 214/518
[51] Int. Cl. .......................................................B65g 60/00
[58] Field of Search......................214/6, 501, 508, 510, 518, 214/520, 8.5 A, 8.5 F, 8.5 G

[56] References Cited

UNITED STATES PATENTS

| | | | |
|---|---|---|---|
| 3,260,380 | 7/1966 | Skromme et al. | 214/6 B |
| 3,442,401 | 5/1969 | Wolfe et al. | 214/6 P |
| 3,373,882 | 3/1968 | Forest | 214/6 B |
| 3,385,456 | 5/1968 | Snider | 214/6 B |
| 3,401,810 | 9/1968 | Grey | 214/6 B |
| 3,446,370 | 5/1969 | Clendenin et al. | 214/6 B |
| 3,478,898 | 11/1969 | Graham et al. | 214/6 B |
| 3,487,955 | 1/1970 | Brown | 214/6 B |
| 3,490,613 | 1/1970 | Eggenmuller et al. | 214/6 B |
| 3,502,229 | 3/1970 | Butler | 214/6 B |
| 3,510,013 | 5/1970 | Best | 214/6 B |
| 3,515,291 | 6/1970 | Grey et al. | 214/6 B |
| 3,521,762 | 7/1970 | Walters | 214/6 B |

*Primary Examiner*—Gerald M. Forlenza
*Assistant Examiner*—Robert J. Spar
*Attorney*—Joseph A. Brown, John C. Thompson and James J. Kennedy

[57] ABSTRACT

A bale wagon which unloads bales one at a time. The wagon is provided with a bale pickup, a bale tier former, and a load rack which receives the tiers of bales from the bale tier former. A cross conveyor is mounted on the bale tier former, and when discharging the bales are dropped a tier at a time from the load rack onto the bale tier former, the lowest layer of bales on the tier being engaged by the cross conveyor and discharged, while the layer next above the lowest layer is held from interference with the lowest layer.

4 Claims, 16 Drawing Figures

BALE WAGON

This is a division of application Ser. No. 755,141, filed Aug. 26, 1968, now Pat. No. 3,502,230.

BACKGROUND OF THE INVENTION

The present invention relates generally to agricultural machinery, and more particularly to a bale wagon which is provided with means for automatically loading and unloading bales of hay and the like.

In different farming communities different bale-handling practices are employed. In the southwestern United States, where the climate is fairly arid, it is common practice to assemble the hay bales into large stacks which are stored either outdoors or under open-sided shelters. In more humid areas, such as for example in the eastern United States, it is usually the practice to store hay bales in an enclosed structure such as a barn.

In recent years attempts have been made to mechanize the handling of bales. However, due to the variations in storing the bales no single machine has heretofore been designed which is suitable for both open stack storage and/or barn storage. Also, those machines which have been developed for bale handling where storage is inside of a barn still require appreciable hand labor in the process of transporting the bales from the field into the barn.

A bale wagon has been developed for handling bales where they are to be stacked outdoors. This wagon, which is illustrated in the U.S. Pat. to Grey No. 2,848,127 issued Aug. 19, 1958, includes a bale pickup mechanism which picks up bales off the ground and transfers the bales onto a first table on the wagon. After a layer of bales has been accumulated on the first table, the bales are then transferred to a second table where they are accumulated to form a tier of bales. The tier of bales, which may have three, four, or more layers, is then transferred onto a load rack or third table where the tiers are then accumulated in side-by-side fashion to form a stack of bales. When a stack of bales has been accumulated on the load rack the load rack is then pivoted rearwardly to deposit the stack of bales upon the ground. The machine shown in the Grey patent does not unload bales individually.

A bale thrower has been developed for use in areas where hay bales are stored in barns. One example of a bale thrower is shown in the U.S. Pat. to Smoker et al. No. 3,132,754 issued May 12, 1964. The bale thrower reduces the manual labor of picking up the bales in the field and transferring them to a wagon, the bales being thrown directly from the baler into the wagon in a random array. However, it is still necessary to manually unload the bales from the wagon onto an elevator, the elevator, or conveyor, subsequently transferring the bales into the barn or other enclosure.

SUMMARY OF THE INVENTION

It is an object of the present invention to provide a mechanism which can pick up bales from the field and automatically discharge the bales one at a time for subsequent conveying into a barn or the like.

More particularly, it is an object of the present invention to provide a hay wagon which has means for picking up bales from a field, means to assemble the bales into stacks, each stack being formed of a plurality of side-by-side tiers and each tier having a plurality of vertically arranged layers, and means operable to discharge the bales in single file.

A further object of this invention is to provide a novel method of unloading bales in which a stack of bales mounted on the bale wagon is unloaded by conveying the bottom layer of a tier of bales outwardly in single file while holding the layer immediately above the bottom layer from interference with the bottom layer, then permitting the next highest layer to drop into the position previously occupied by the discharged bales, then, while holding the next highest layer out of engagement with the bales now in the lower position, discharging the lower bales, and repeating the above steps until the entire tier has been discharged, and then advancing the stack of bales on the wagon toward the discharge portion until another tier of bales assumes the position originally assumed by the discharged tier, and then repeating the previous discharging steps.

It is another object of this invention to provide a method of discharging bales on a bale wagon having pickup means and means to form the picked up bales into tiers which are subsequently assembled into a stack on the load-receiving bed of the wagon, the method including the steps of advancing the stack forwardly toward the tier-forming means until the foremost tier is in engagement with the tier-forming means, and then discharging the bales in single file, layer by layer.

A still further object of the present invention is to provide a bale wagon having pickup means adapted to pick up bales from the field, a tier-forming means which receives bales from the pickup means and assembles them into tiers having a plurality of layers, and a load rack which receives the tiers of bales and forms them into a stack having a plurality of side-by-side tiers, the tier-forming means being provided further with means for discharging the bales in single file, and the load rack being provided further with means for advancing the stack of bales toward the tier-forming means.

The above objects, and others which will be apparent to those skilled in the art, are accomplished by providing a bale stacking and handling wagon having a chassis which is adapted to be propelled forwardly over the field. Mounted on the forward end of the chassis is a bale pickup device which picks up bales one at a time and accumulates two or more bales in a transverse array on a first table. When the first table has been fully loaded it automatically swings upwardly about a transversely extending pivot to dump the bales upon a second table. As additional layers are accumulated on the first table they are automatically transferred to the second table to form a tier having a plurality of layers. Once the second table has been fully loaded it transfers the tier to a load rack or third table spaced rearwardly of the second table by a swinging movement of the second table about rearwardly spaced transverse pivot means. Additional tiers are loaded onto the load rack to form a stack of bales. Once a stack of bales has been accumulated upon the load rack it may be discharged in either of two modes, one being as a stack, and the other being individually. When it is desired to discharge the bales as a stack, the load rack is pivoted rearwardly about a transverse axis to set the entire load upon the ground. If it is desired to discharge the bales individually, the stack of bales on the load rack is shifted forwardly until one tier of bales falls on the second table which is held in an inclined position. A cross conveyor on the second table then moves the lower layer of bales outwardly to a discharge point, while means engage the layer of bales next above the lowest layer to hold them from interference with the lowest layer of bales. After the first layer of bales has been discharged the second layer is permitted to drop and the operation is then repeated until the entire tier has been discharged. After the tier has been discharged the stack is advanced forwardly again to deposit the second tier on the inclined second table and the procedure set forth above is then repeated until the entire stack has been discharged. In the drawings:

DESCRIPTION OF THE PREFERRED EMBODIMENT

In the following description right-hand and left-hand reference is determined by standing at the rear of the bale wagon and facing in the direction of travel.

IN GENERAL

The bale wagon of this invention is provided with a chassis, indicated generally as 10, mounted on a pair of right- and left-hand wheels, only the right wheel 12 being shown in the various figures. The chassis is formed of left and right longitudinally extending rails, 14 and 16, respectively, which converge together at their forward end. The forward end of the chassis is provided with a clevis assembly 18 (FIG. 1A) which is adapted to be secured to a tractor represented by the drawbar 20. A power shaft 22 is rotatably journaled on the chassis 10, such as for example by bracket 24, and its forward end is adapted to be secured to the power takeoff of a tractor. Secured to a rear portion of power shaft 22 are first and second sprockets 28 and 30. A chain 32 is disposed over the sprocket 30 and a sprocket 34 mounted on the forward end of a pump 500 FIG. 2A which is secured to the chassis in any conventional fashion. It should be noted at this point that while the bale wagon illustrated in the drawings is adapted to be secured to a tractor having a power takeoff shaft, the bale wagon may be self-propelled, or be provided with its own power source.

Mounted on the forward end of the chassis is a bale pickup mechanism indicated generally 100. (FIGS. 1A and 2A) The bale pickup mechanism 100 is adapted to pick up bales which are laying in the field over which the bale wagon is traversing and to transfer the bales to a first transfer table indicated generally at 150. A second transfer table, indicated generally 200 is mounted to the rear of the first transfer table. Rows, or layers, of bales transferred from the first table 150 onto the second table 200 are accumulated to form tiers. Mounted on the chassis to the rear of the second transfer table is a third transfer table or load rack 250. Tiers of bales are transferred from the second table onto the load rack 250, the tiers of bales being supported in part by a rolling rack, indicated generally at 300. (FIG. 1B) The foregoing structure, as broadly outlined above, is well known in the prior art, one example of this being shown in the aforementioned Grey patent.

In the embodiment illustrated in the drawings each layer formed on the first table has two bales, and each tier formed on the second table has four layers, and thus a total of eight bales. However, it should be understood that the layers and tiers may be formed with different numbers of bales and layers, respectively.

A cross conveyor 350 (FIGS. 1A and 2A) is mounted on the second table, the conveyor 350 being adapted to discharge bales on the second table to the right-hand side thereof. Bale-engaging means, indicated generally at 352, are mounted on the second table and are operable to contact a layer above the layer being discharged to prevent interference with the layer of bales being discharged.

The first, second, and third tables, the cross conveyor, and the bale-engaging means are operated by various hydraulic devices which receive their fluid power from the pump 500 in a manner which is more fully described below. While the bale wagon is provided with its own pump, it should be obvious to those having ordinary skill in the art that when the implement is connected to a tractor that the tractor hydraulic system may be used to supply the hydraulic power required by the bale wagon.

BALE PICKUP

The bale pickup mechanism 100 (FIGS. 1A and 2A) has a frame which is disposed to the left side of the chassis and is mounted thereon in a conventional manner for swinging movement about a generally longitudinally extending axis disposed between the frame and the chassis 10. The forward end of the frame is open and extending upwardly along the backwall 102 is a conveyor 104 having lugs 104'. The frame has outer and inner sidewalls 106, 108, respectively, and a following door (not illustrated) is pivotally mounted on the upper forward cross frame member 110. As previously mentioned the power shaft 22 is provided with a first sprocket 28. A chain 128 is disposed over the sprocket 28 and also over a sprocket 130 mounted on a longitudinally extending jack shaft 132 which is in turn mounted to the left side of the chassis. A sheave 134 is mounted on the rear end of the jack shaft and power is transmitted from this sheave by a belt 136 to a sheave 138 mounted on a jack shaft 139 which is journaled for rotation on the pickup bale frame. The belt 136 passes over a pair of mule sheaves (not shown). A sprocket 140 is mounted on shaft 139, and the conveyor 104 is driven by the sprocket 140. A sprocket 142 is mounted on a midportion of the jack shaft 132 and drives a conveyor chain 144 whose inner end is disposed about a sprocket 146 mounted in a suitable fashion on the chassis.

As the bale wagon of this invention is propelled over a field having bales thereon, the one end of one of the bales (indicated at A in FIG. 2A) will enter the open forward end of the bale pickup mechanism and engage the conveyor 104. As the conveyor rotates in a counterclockwise direction (when viewed from the right) the rear end of the bale will be elevated (as indicated at B in FIG. 2A) and continued rotation of the conveyor will cause the bale to be moved upwardly as it is confined between the conveyor, the inner and outer sidewalls, and the following door, until it can fall on its side over the top of the inner side onto the first transfer table, assuming the position indicated at C in FIG. 2A. The means for tipping each bale laterally onto the first table is not shown, but may be similar to that shown in the Grey patent.

FIRST TRANSFER TABLE

The first transfer table 150 (FIGS. 1A and 2A) is formed of two transversely extending beams 152 and 154 which are mounted on the forwardly extending horizontal portion 156 of an L-shaped structure indicated generally at 158. The L-shaped structure includes a rear upwardly extending leg portion 160 which is pivotally secured at 162 to spaced-apart brackets 164 mounted on the right- and left-hand side rails 16, 14, respectively. A hydraulic cylinder 502 is pivotally secured by means of a pivot pin 166 to a forwardly extending lug 168 which is mounted on a transverse frame member 170, the member 170 being mounted between the right- and left-hand rails of the chassis 10. The rod end 504 of the cylinder 502 is pivotally secured to an arm 172 which is welded or otherwise secured to the L-shaped member 158. It should be obvious that if the cylinder 502 is extended that the first transfer table 150 will be swung upwardly about the pivot point 162 transferring any bales on the table (such as for example bale C) onto the second transfer table 200, the transferred bale assuming the position shown at D. The first table cylinder 502 is caused to be operated by actuation of a trip lever 174 (FIG. 1A) which will cause the valve 506 to direct fluid from the pump 500 into the cylinder 502. It should be noted however that the trip lever 174 will not actuate the valve 506 unless a bale is contacting a second trip lever 176. This is to prevent accidental transfer of only one bale from the first table onto the second table if when loading the first bale it should slide from the left-hand end to the right-hand end of the transfer table. However, in normal operation the first bale will not contact the trip lever 174 until it is forced into its furthest right-hand position by the loading of additional bales behind it. The operation of the bale pickup and the first transfer table is more fully disclosed in the U.S. Pat. to Grey et al. No. 3,330,424 issued July 11, 1967.

SECOND TABLE

The second transfer table (FIGS. 1A and 2A) is mounted on a pair of L-shaped structures 202 each having a forwardly extending leg portion 204 and an upwardly extending rear leg portion 206 which is disposed at right angles to the portion 204, each of upwardly extending portions 206 being secured by pivot 208 to depending lug 210 mounted on the forward end portion 252 of the load rack. A transverse frame member 211 is welded across the forward ends of the legs 204 and it may be supported on a pair of spaced-apart rubber blocks 212. The blocks 212 are mounted on a transversely extending rail member 214 which is welded or otherwise suitably secured to the brackets 164. Plates 215 are fixed across legs 204 and 211 and form the surface upon which tiers are formed. In the normal tier-forming position the second table 200 is disposed in the position shown in FIGS. 2A and 13 with the member 211 supported on blocks 212. However, when it is desired to transfer a tier of bales formed on the table 200 to the load rack the second table cylinder 508 (FIG. 2B) is extended causing the table 200 to swing about the pivot point 208. The anchor end 510 of the cylinder 508 is secured by means of a pivot pin 216 to the load rack 250. The rod end 512 is pivotally secured by means of a pivot 218 to a rearwardly extending member 220 whose forward end is secured to a rear portion of the L-shaped structure 202.

The operation of the second table 200 and of its cylinder 508 will be more fully set forth below, however, it should be noted when four layers of bales D have been accumulated on the second table during the stack-forming operation that the table will automatically swing up about the pivot 208 to deposit the tier of bales in the position shown by the bales E in FIG. 2A, and then automatically resume its tier-forming position shown in FIGS. 2A and 11.

LOAD RACK

The load rack or load bed 250 includes a platform assembly 254 which is mounted for swinging movement about a pair of transversely rearwardly disposed pivot pins 256. The pivot pins 256 are supported on upwardly and rearwardly extending brackets 258 secured to the rear end of the left- and right-hand frame members 14, 16, respectively.

During the stack-forming operation as the second table 200 is swung upwardly to deposit the tiers of bales upon the load bed 250 the rolling rack 300 is contacted by the bales and forced rearwardly as successive tiers of bales are placed upon the load rack 250. The tiers of bales are laterally confined by right- and left-hand side shields 260, only the right-hand side shield being shown in FIG. 2B. Each side shield is supported by upwardly extending front and rear struts 262, 264, respectively, the upper end of the struts being secured to each other. A plurality of transversely arrayed tines 266 are carried by a transversely extending rod 268 whose ends are journaled in an adjustable bracket 270, the adjustable bracket being secured to a fixed member 272 carried by the upper end of the struts 262, 264. The tines 266 are pivotally secured to the rod 268 for limited vertical movement and the position of the rod 268 is controlled by a control lever assembly 274. When the handle 276 of the control lever assembly is in its lower position (FIG. 2B) the rod 268 has been rotated to its full extent in a counterclockwise direction. In this position the lower ends 278 of the tines 266 will be engaged by the tiers of bales as they are loaded upon the platform 254 of the load bed. However, the tines will be able to pivot upwardly about the rod to permit the tier of bales to be loaded on the bed. After one or more tiers have been loaded onto the load rack the end 278 of each tine 266 will engage the top of the last loaded tier to prevent forward tipping movement of the tier. When unloading the tiers forwardly, as when single-bale unloading, it is necessary to move the tines 266 out of engagement with the upper layer of bales of tiers. This is accomplished by swinging the handle 276 to its upper position shown in FIG. 2C. In this position the rod 268 will be rotated clockwise and the tines 266 will be engaged by an abutment carried by the rod 268 and swung to an out-of-the-way position shown in FIG. 2C. The handle 276 is interconnected with the rod 268 by means of a bracket 280 fixed to the rod 268, and a link in the form of a rod 282, one end of the rod 282 being connected to the bracket 280 and the other end of the rod being connected to a rotatable lug 284 mounted on one side of the handle. The handle is secured by means of a pivot 286 to a lug 288 carried by the strut 262. A catch 290 is adapted to engage the handle 276 and hold it in its lowest position while a second catch 292 is adapted to hold the handle 276 in its upward position. Each of the catches 290, 292 is mounted on the strut 262.

A reinforcing pipe 294 extends between the right- and left-hand brackets 272.

Forks 296 are mounted to the rear of the platform assembly 254, each of the forks 296 being formed of a plurality of metal plates which are welded together in a laminated form. In the embodiment shown in the drawings the lower portion 296b is formed from five plates, while the upper portion 296 is formed from an extension of the outer two plates and the intermediate plate.

ROLLING RACK

Figure 12:
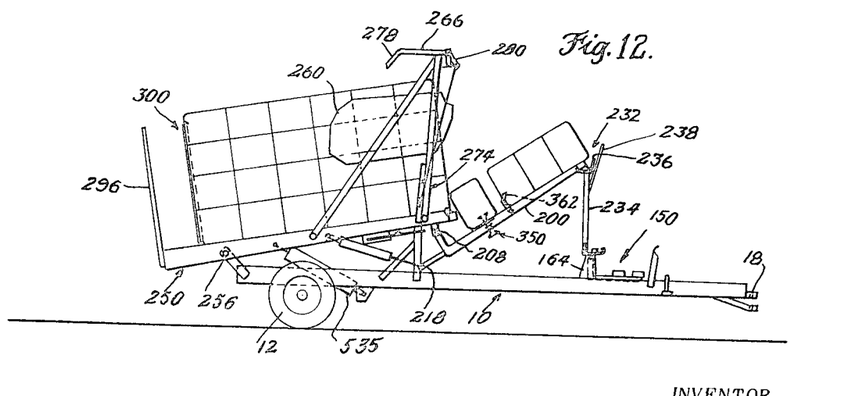

The rolling rack 300 is mounted on the platform assembly 254 of the load rack 250 and is adapted to support a stack of bales in the manner best shown in FIG. 12. The rolling rack 300 includes two spaced-apart forks 302 (FIG. 15) which are mounted for movement on the platform 254. Each fork 302 includes a transversely extending web portion 304, a rearwardly extending inner aligning portion 306 and a forwardly extending outer portion 308, which is adapted to dig into the bales loaded against the fork to provide lateral stability.

Figure 7:
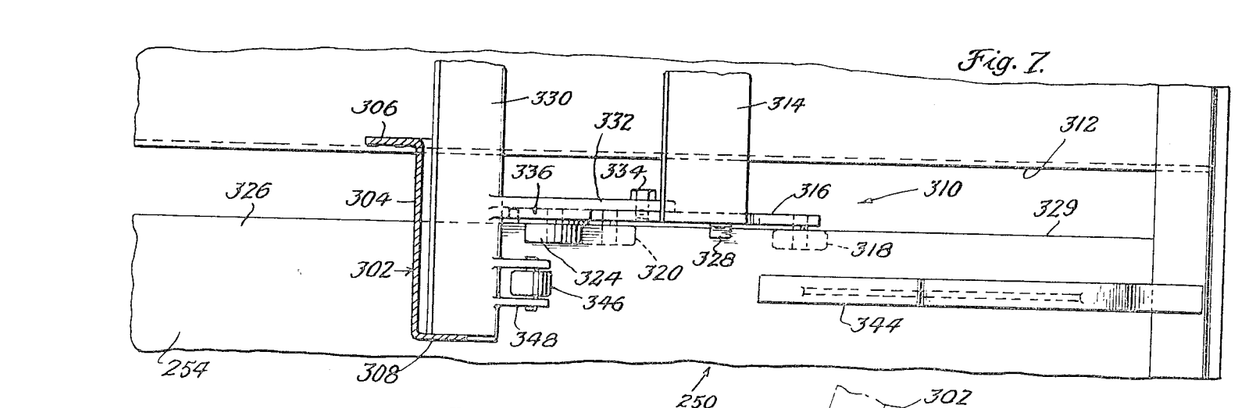
FIGS. 7 and 8 are plan and side views, respectively, of the rolling rack which advances the stack of bales forwardly on the load rack, and includes details of the cam means which causes the rolling rack to tip forwardly as the last tier of bales is discharged onto the second table.
Figure 8:
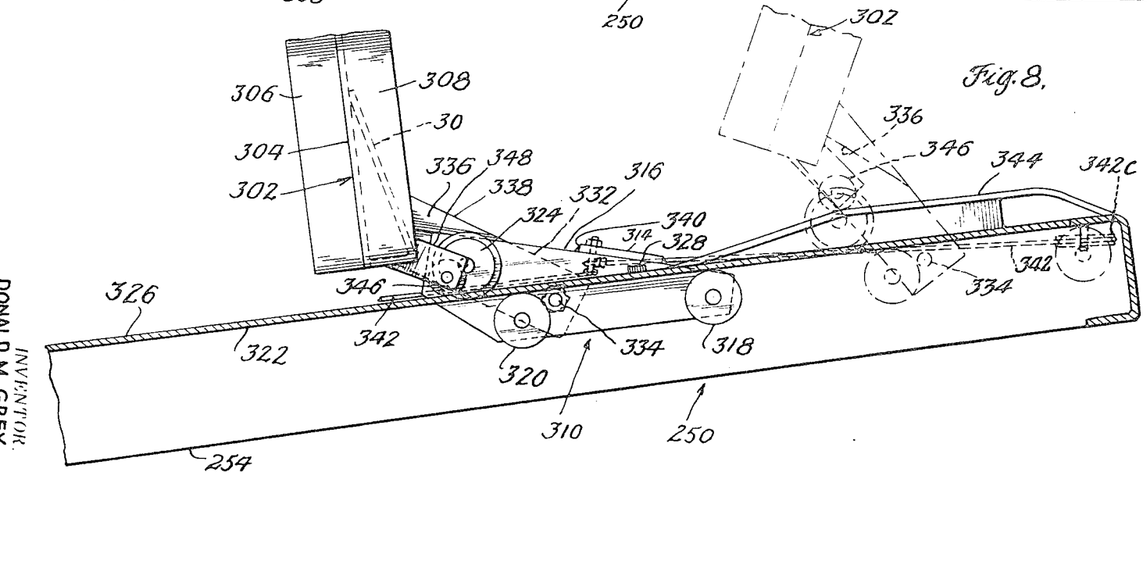

The forks 302 are carried for movement on the assembly 254 by a pair of trolley assemblies 310 (shown in detail in FIGS. 7 and 8) each trolley assembly being adapted to run in a groove 312 formed in the platform assembly 254. The two trolley assemblies are interconnected by a transversely extending member 314. Each trolley assembly includes a longitudinally extending member 316 which is welded to an end of the transverse member 314. Front and rear lower rollers 318, 320, respectively, are mounted on the member 316 in a conventional fashion, the roller being adapted to contact the lower surface 322 of the platform assembly 254 adjacent the groove 312. An upper rear roller 324 is mounted on member 316, the roller 324 being adapted to contact the upper surface 326. A rack pad 328 is also secured to the member 316, the lower surface of the rack pad being adapted to contact the upper surface 326. From the foregoing, it can be seen that the member 316 can move only in a fore-and-aft direction as its vertical movement is limited by the rollers 318, 320, and 324 as well as by pad 328, the transverse movement of the member 316 being limited by the transverse member 314 and the outer edge 329 of the groove 312.

Each of the forks 302 is welded to a transversely extending member 330 which is triangular in cross section, the outer flange 308 being welded to the end of the member 330. A pair of forwardly extending mounting brackets 332 are welded at their rear ends to the triangular frame member 330, the forward ends of the brackets 332 being pivotally secured to the member 316 by means of a pivot bolt 334. Rearward pivotal movement of the forks 302 is controlled by a stop 336 which contacts the upper rear surface of the member 316, the stop 336 being welded to one side of the bracket 332. Forward pivotal movement is limited by the contact of the upper surface 338 of the bracket 332 with the rear edge 340 of the transverse member 314, although in normal operation it is not likely that the rack will contact the rear edge 340 except upon completion of the discharge of the last tier of bales when unloading in the single-bale mode.

The operation of the rolling rack will be more fully described below, however at this point it should be noted that the rolling rack can be advanced forwardly or rearwardly by means of a cable 342, the cable being interconnected with a double-acting hydraulic cylinder 528. When tiers of bales are being loaded onto the load rack fluid is displaced from the cylinder through a relief valve back to the reservoir to permit the rack to be moved rearwardly as tiers of bales are being loaded onto the load bed, however, the cylinder may be positively controlled for either forward or reverse movement of the forks 302 as when picking up a stack of bales or unloading tiers of bales onto the second table for discharge a bale at a time.

When unloading tiers of bales onto the second table it is necessary to tip the last tier forwardly to properly deposit it upon the second table. To this end a pair of cams 344 are mounted on the platform assembly 254 to either side of the grooves 312. A cam roller 346 is journaled between a pair of spaced-apart lugs 348 which extend forwardly from the triangular cross section frame member 330, there being one roller 346 for each cam track 344. As the rolling rack is advanced forwardly from its full-line position (FIG. 8) to its broken line position, the roller 346 will contact the cam track 344 and cause the forks to rotate forwardly about the pivot bolt 344 in such a manner that the forks will assume the inclined position shown in FIG. 2B.

DISCHARGE CONVEYOR AND BALE-ENGAGING MEANS

Figure 1B:
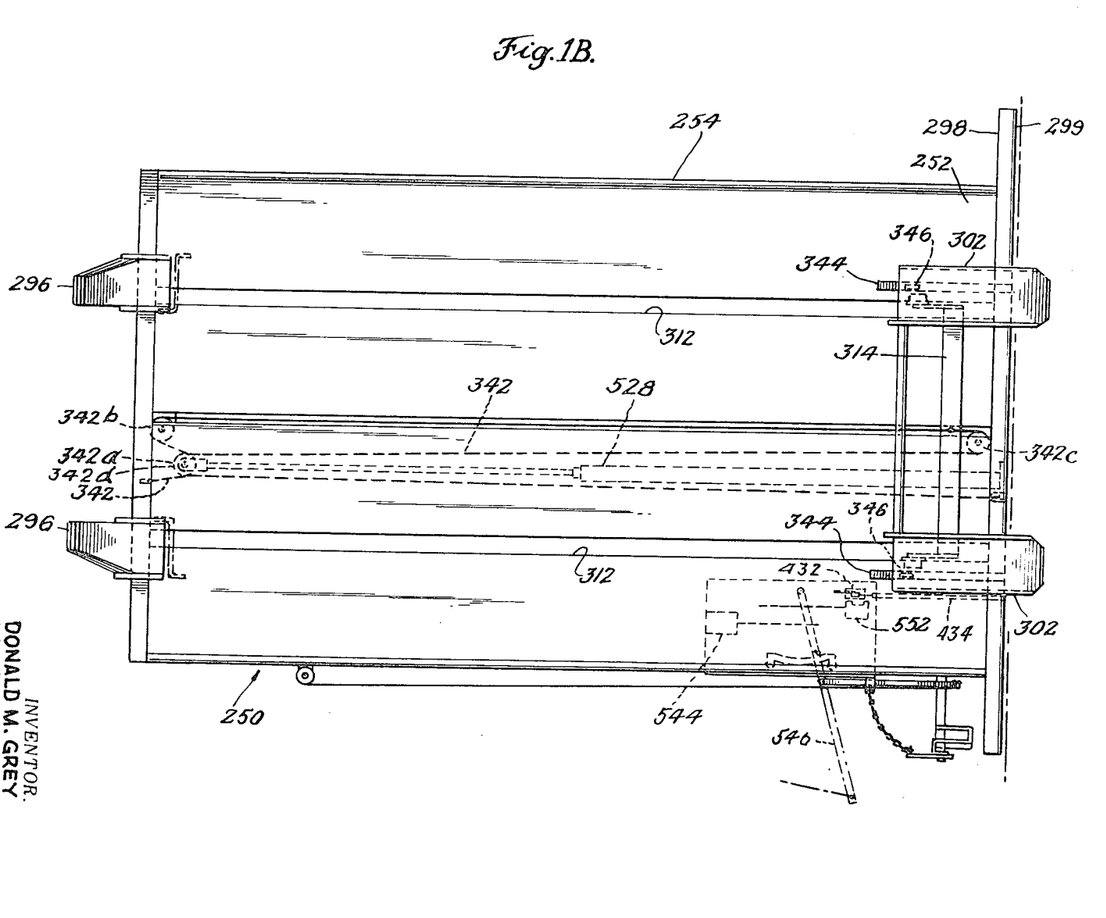
Figures 2A, 2C:
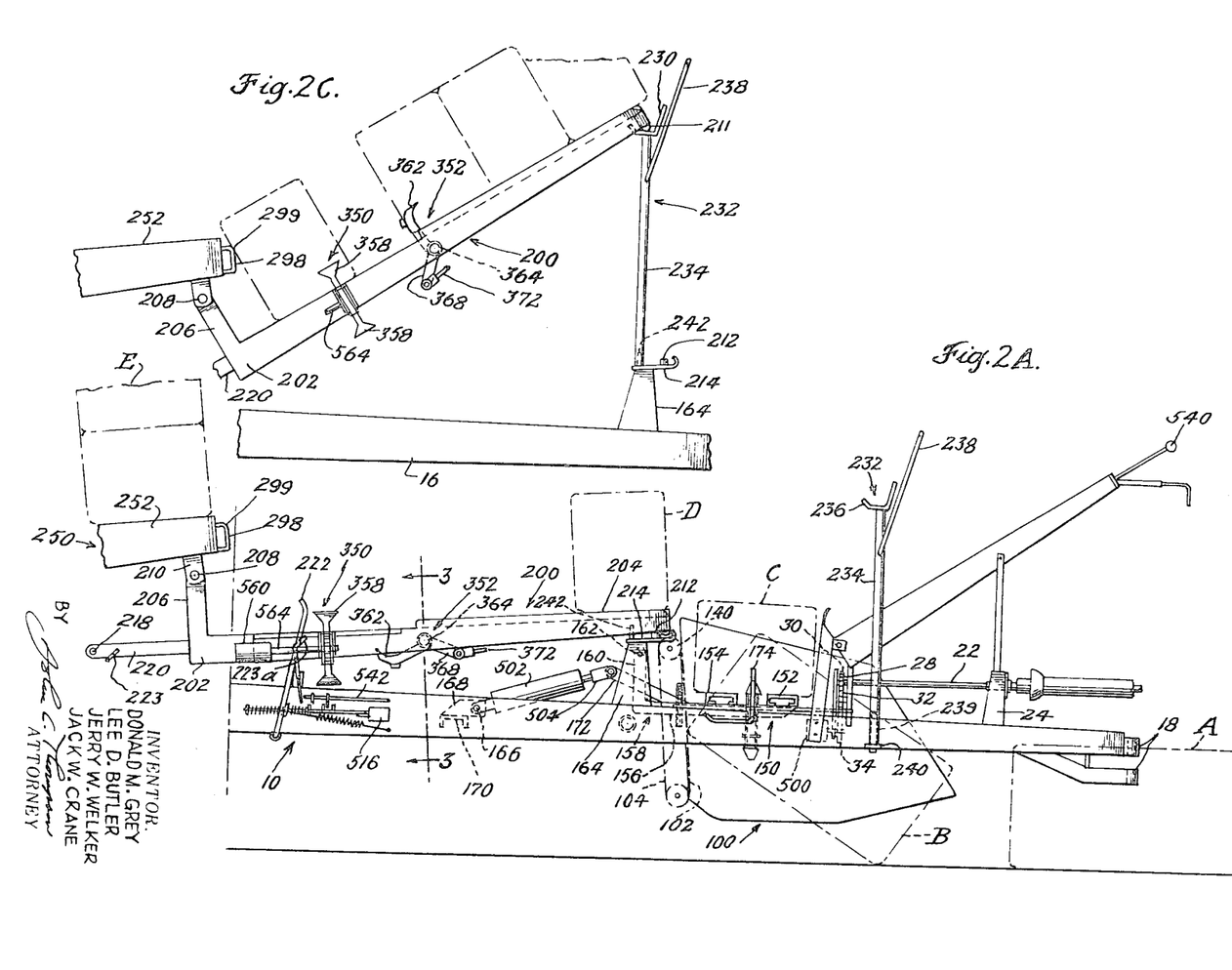
FIGS. 2A and 2B are side views of the front and rear portions, respectively, of the bale wagon of this invention.
FIG. 2C is a side view of the second table of the bale wagon in its single-bale unloading position.
Figure 3:
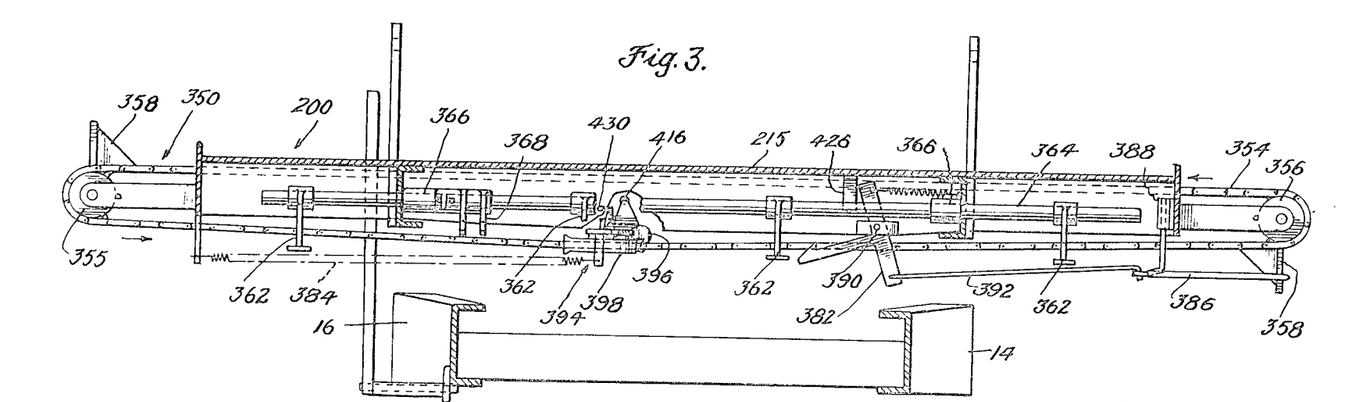
FIG. 3 is a section taken along the lines 3—3 in FIG. 2A showing the second table cross conveyor in the position normally assumed when single-bale unloading.
Figure 4:
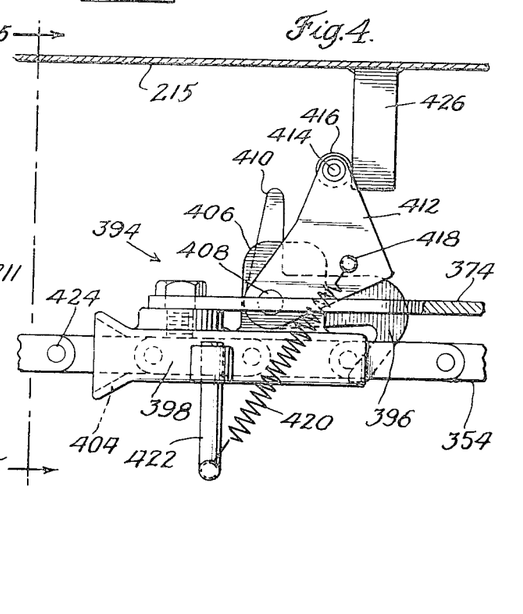
FIG. 4 is an enlarged view of a detail shown in FIG. 3.
Figure 5:
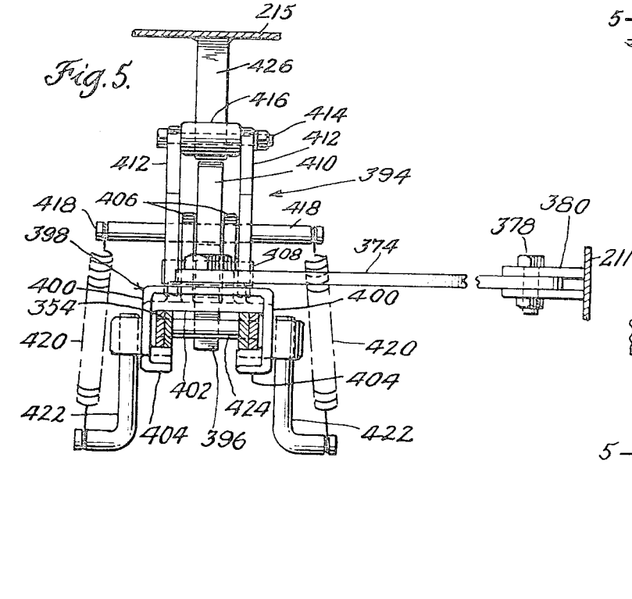
FIG. 5 is a view taken along the line 5—5 in FIG. 4.

When single-bale unloading, tiers of bales are discharged one at a time onto the second table, and a cross conveyor 350 engages the end bale of the lowest layer of bales and shifts the bales to the right for discharge, the bale-engaging means 352 engaging the layers of bales above the layer being discharged, this being best illustrated in FIG. 2C. The cross conveyor is best illustrated in FIGS. 3, 4, and 5 and includes a conveyor chain 354 disposed over a right driven sprocket 355 and a left idler sprocket 356. A pair of paddles 358 are mounted on the conveyor chains and are adapted to contact the left-hand end of a layer of bales and shift them to the right for discharge. The cross conveyor 350 extends through a groove 360 in the rear portion of the second table 200. The bale-engaging hooks 352 are controlled by the conveyor 350 in such a fashion that the hooks will be withdrawn as the layer being discharged has passed completely to the right of the layer above it. Obviously, if the table is inclined, in the manner shown in FIG. 12, the bales disposed above the discharge layer will shift downwardly until they engage the upper rounded corner 299 of box beam member 298 (FIG. 2A) on the forward edge of the load bed 250. The box beam member extends laterally outwardly to either side of the platform assembly (FIG. 1B) to provide additional support for the bales being discharged.

The bale-engaging means 352 are in the form of hooks 362 (FIGS. 2A and 6) fixedly secured to a rotatable rock shaft 364, the shaft being journaled in a pair of bearings 366 carried by the two leg portions 204. A rock arm 368 is secured to the rock shaft 364 and is adapted to be actuated by a rock lever 370 through means of a pivoted link 372. The rock lever 370 is welded on one arm to a swingable arm 374, there being a brace 376 extending between an intermediate portion of the lever 370 and an intermediate portion of the arm 374. The arm 374 is pivotally secured by means of a pivot pin 378 to a rearwardly extending lug 380 mounted on the transverse frame member 211. When the arm 374 is moved to the left from the full-line position shown in FIG. 6 to the broken line position the lever 370 will move rearwardly causing the rock shaft 364 to rotate in a clockwise direction (when viewed from the right) raising the hooks 362 into engagement with the bales. As the rock shaft continues rotation the layers of bales above the layer which is to be discharged will be shifted upwardly and forwardly to the position indicated in FIG. 12. When the swingable arm 374 swings from the broken line position to the full-line position in FIG. 6 the hooks will be retracted and the bales held by the hooks may drop by gravity until the lowermost bale contacts the rounded edge 299 of the box beam member 298.

The swingable arm 374 is caused to be moved from the full-line position to the broken line position by the conveyor, the arm being held in the broken line position by a latch mechanism 382. Upon the release of the latch mechanism 382 the swingable arm will be swung to the full-line position by the action of spring 384. The latch 382 is controlled, or tripped, by the action of the paddles 358 as it contacts a trip arm 386. When the arm 386 is contacted it will pivot within the aperture lug 388, causing the latch 382 to swing away from arm 374 about the pivot 390 by the action of the link 392 which interconnects the latch 382 with the trip arm 386.

At one end of the swingable arm 374 is a conveyor-engaging assembly, indicated generally at 394. The conveyor-engaging assembly is provided with a hook 396 which is caused to be swung into engagement with the conveyor chain when the arm 376 attains its full-line position in FIG. 6, the hook being swung out of engagement with the conveyor chain when the arm 396 attains its broken-line position shown in FIG. 6. The conveyor-engaging assembly includes a shuttle 398 which is slidably disposed about the conveyor chain, the shuttle having front and rear side portions 400 disposed to either side of a bight portion 402 whose lower surface rides upon the upper surface of the lower flight of the conveyor, there being inwardly directed flange portions 404 at the lower end of the side portions 400. A pair of upwardly extending lugs 406 are mounted on the bight 402 of the shuttle and a pin 408 is carried thereby. The hook 396 is journaled about the pin 408 and has an upwardly extending end portion 410. A hook-actuating assembly including spaced-apart plates 412 are also journaled about the pin 408. The upper ends of the plates 412 carry a stud assembly 414 about which is journaled a roller 416. Extending through and to either side of the plates 412 is a pin 418, the ends of the pin being interconnected by springs 420 to downwardly and outwardly extending L-shaped members 422 carried by the shuttle 398.

The operation of the discharge conveyor 350 and the bale-engaging means 352 is as follows: The sprocket 355 is rotated causing the conveyor chain to rotate in the direction indicated by the arrows in FIG. 3. Assuming that the paddles are in the position shown in FIG. 3 and the hooks are retracted (with the swingable arm in the position shown in full lines in FIG. 6), movement of the conveyor chain will cause the arm to move from the full-line position towards the broken line position in FIG. 6. As the shuttle advances to the left side of the machine the arm 374 will pass over the latch 382. Continued movement to the left will cause the hook to be disengaged from the cross pin 424 when the roller 416 contacts the abutment 426 carried on the lower surface of one of the plates 215. While the shuttle is now disengaged from the conveyor, the arm will not return to the full-line position as it is engaged by the latch 382. When the paddle contacts the trip arm 386 the latch 382 will be released and the arm 374 will swing toward its full-line position. During this movement the hook 396 will be held from engagement with any cross pin 424 since the plate 412 will have swung to an overcenter position, that is to say that the springs 420 have passed to the other side of the pivot pin 408, the upper end of the hook being in contact with the intermediate portion of pin 418. When the arm reaches its full-line position the roller 416 will contact the cross shaft 430 (secured to the underside of the second table in a conventional manner) forcing the plates away from their overcenter position whereby the pin 418 will not be in contact with the upper end 410 of the hook 396. In this position the hook will drop by gravity until the hook portion engages one of the cross pins 424.

BALE PICKUP AND STACK FORMING OPERATION

As the bale wagon of this invention is propelled forwardly over a field it will pick up bales laying upon the ground, indicated at A in FIG. 2A and lift them upwardly initially to a position indicated at 2B and then to a position where the major axis of the bale is vertical, at which time it will be tipped over onto its side into the position indicated at C in FIG. 2A. The first bale will be conveyed to the right by the conveyor chain indicated at 144, and when a second bale is picked up and loaded onto the first table the first bale will contact the trip lever 174 and the second bale will contact the second trip lever 176 causing the valve 506 to shift from its normal position shown in FIG. 9 to that position where fluid will be directed into the first table cylinder 502 causing the cylinder to extend forcing the table upwardly to shift the layer of bales onto the forward edge of the second table. As the table 150 attains its fully raised position the valve 506 is shifted back to its normal position by a trip mechanism not material to the present invention, and the table will then fall to its lowered position forcing the fluid trapped within the cylinder 502 through the valve 506 back to the fluid reservoir 514. As additional pairs of bales are picked up they will be formed into a layer on the first table and transferred to the second table until four layers have been accumulated upon the second table. At this point the rearward layer of bales on the table will contact trip lever 222 moving it back to a latched position against the action of spring 222a, the second table valve 516 shifting from its normal position, shown in FIG. 9, through an intermediate valve position to that position where the fluid is directed through line 518, pilot operated check valve or lock out valve 520, and line 522 to the anchor end of the second table cylinder 508. As the second table cylinder is extended it will raise the table 200. As the second table 200 swings upwardly due to the extension of the cylinder 508 the cam 224 on the L-shaped support structure 202 for the second table (FIG. 2B) will move out of contact with the shoe 226 carried by the upwardly biased rod 228. As the rod 228 moves upwardly the selector valve 524 will be shifted from the normal position shown in FIG. 9 to its other position causing displaced oil from the cylinder 508 to flow through line 526 and second table control valve 516 back into reservoir 514. As the table 200 attains its fully raised position it will set the tier of bales formed on the second table on the forward end of the load rack or bed as represented by the broken line bales E in FIG. 2A. At this point the trip 223 (FIG. 2B) on the rearwardly extending member 220 will contact the latch release arm 223a, releasing the latch which holds arm 222 permitting it to be shifted forwardly by the spring 222a. As the trip lever 222 moves forwardly the spool within the second table control valve 416 will be shifted causing the flow of fluid within lines 518 and 526 to be reversed, the fluid initially entering the rod end of the cylinder 508 and being discharged through the line 522, lock out valve 520, line 518, and valve 516 back to the reservoir 514. After the table has descended partially the shoe 226 will be contacted by the cam 224 shifting the valve 524 back to its normal position shown in FIG. 9 at which time flow from the pump through the valve 516 will return to reservoir 514 through valve 524. However, the weight of the second table will continue to force the cylinder assembly 508 into its retracted position displacing the fluid from the anchor end of the cylinder through lines 522 and 518 into the reservoir. It should be noted that during this stage of the operation if pressure should fail within the system lock out valve 520 will prevent the table from descending any further.

As the tiers of bales are placed upon the load bed they will contact the rolling rack 300 and force it rearwardly. As previously noted the movement of the rolling rack is controlled by a cylinder, the rack being interconnected with the cylinder by means of a cable 342. One end of the cable 342 is connected to the rear end of the platform assembly 254, intermediate portions of the cable being disposed over first, second, third, and fourth sheaves 342a, 342b, 342c, and 342d, mounted respectively on the rod end of the rolling rack cylinder 528, the rear end of the platform assembly 254, the forward end of the platform assembly 254, and the rod end of the cylinder 528. An intermediate portion of the cable between sheaves 342b and 342c is fixedly secured to the transverse frame member 314. As the tiers of bales are loaded onto the load bed the rolling rack will be shifted rearwardly. During this operation the control valve 530 is in its normal position shown in FIG. 9 and fluid is discharged from the anchor end of the cylinder through a low-pressure relief valve 532. A portion of the displaced fluid will return to the rod end of the cylinder 528 through line 533 and check valve 534, while the balance of the fluid will return to the reservoir 514. When the load bed is fully loaded the forks 302 will overlie the forks 296 mounted on the platform assembly 254, with the rearwardly extending flange portions 306 being disposed to the inner side of the forks 296, this being best illustrated in FIG. 1B.

STACKING OPERATION

Figure 1A:
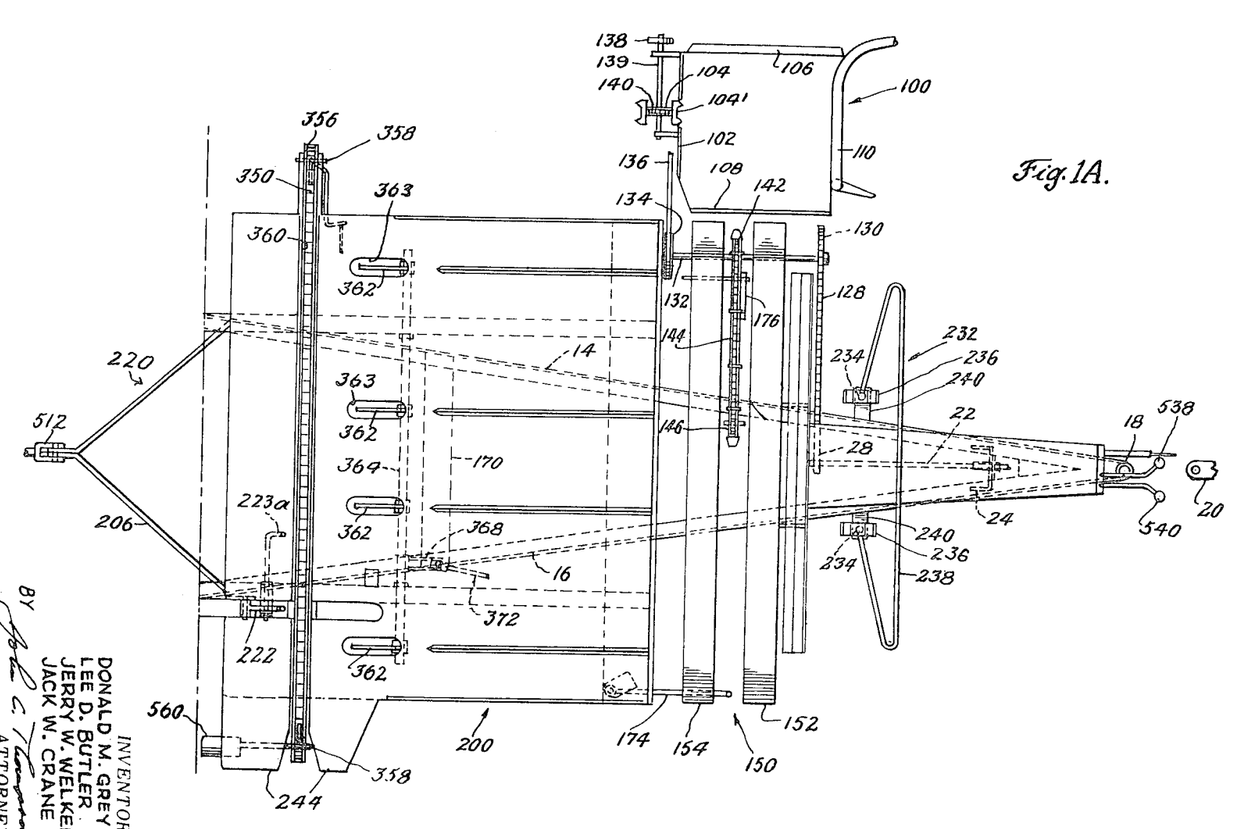
FIGS. 1A and 1B are plan views of the front and rear portions, respectively, of the bale wagon of this invention.
Figures 2B, 2D:
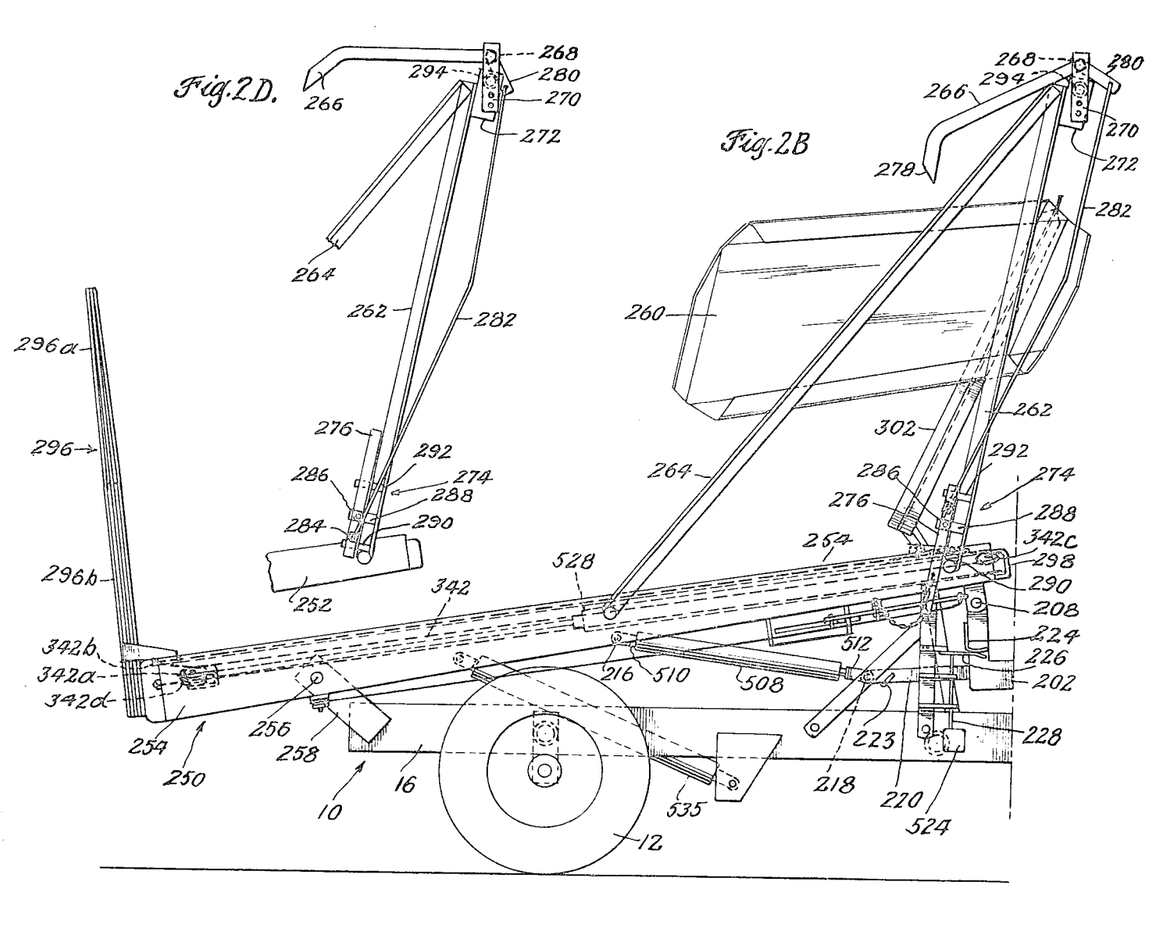
FIG. 2D is a side view of bale-engaging tines disposed in their single-bale unloading position.
Figure 10:
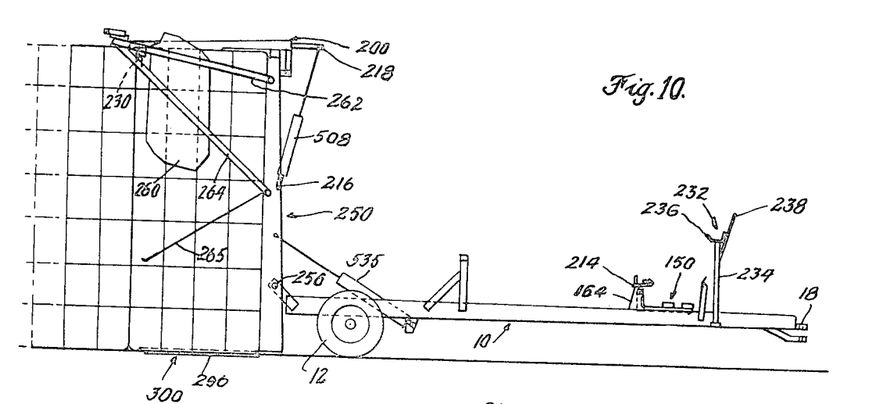
FIGS. 10, 11, and 12 are somewhat schematic side views illustrating the bale wagon of this invention and various stages of its operation, FIG. 10 showing the position of the bale wagon when retrieving a stack of bales, FIG. 11 showing the bale wagon with a full stack of bales upon the load rack, and FIG. 14 illustrating the wagon after one tier of bales has been shifted from the full stack onto the second table for discharge.
Figure 11:
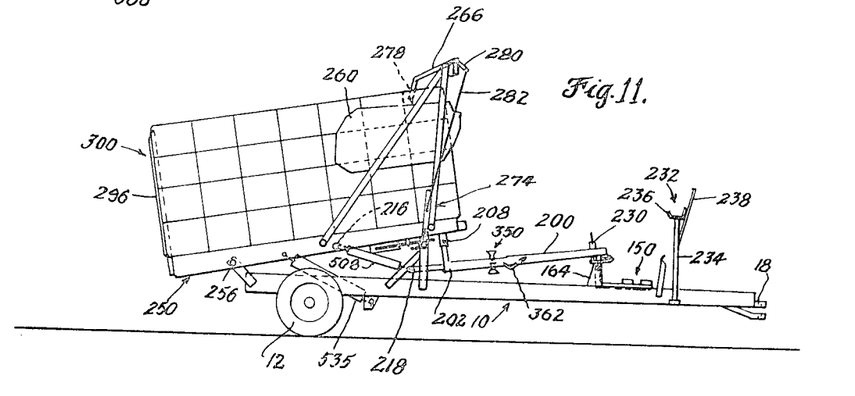

When the third transfer table has been fully loaded, in the manner indicated in FIG. 11, the load can be transferred onto the ground in the form of a stack simply by causing the third cable cylinders 535 to be extended, only one of the two third table cylinders being shown in the drawings. After the stack has attained the position illustrated in FIG. 10 it is only necessary to move the wagon forwardly to leave the stack upon the ground, the forks 296, 302 sliding out from beneath the stack of bales. The cylinders 535 are controlled by a valve 536 which is shifted manually through control lever 538 at the forward end of the wagon (FIG. 1A). After the stack has been unloaded it is then only necessary to shift the valve to return the cylinders to their fully retracted position, at which point the valve 536 is placed in its neutral position which permits flow from the pump 500 to go to the valve 516 which controls the second table.

STACK RETRIEVING OPERATION

Figure 9:
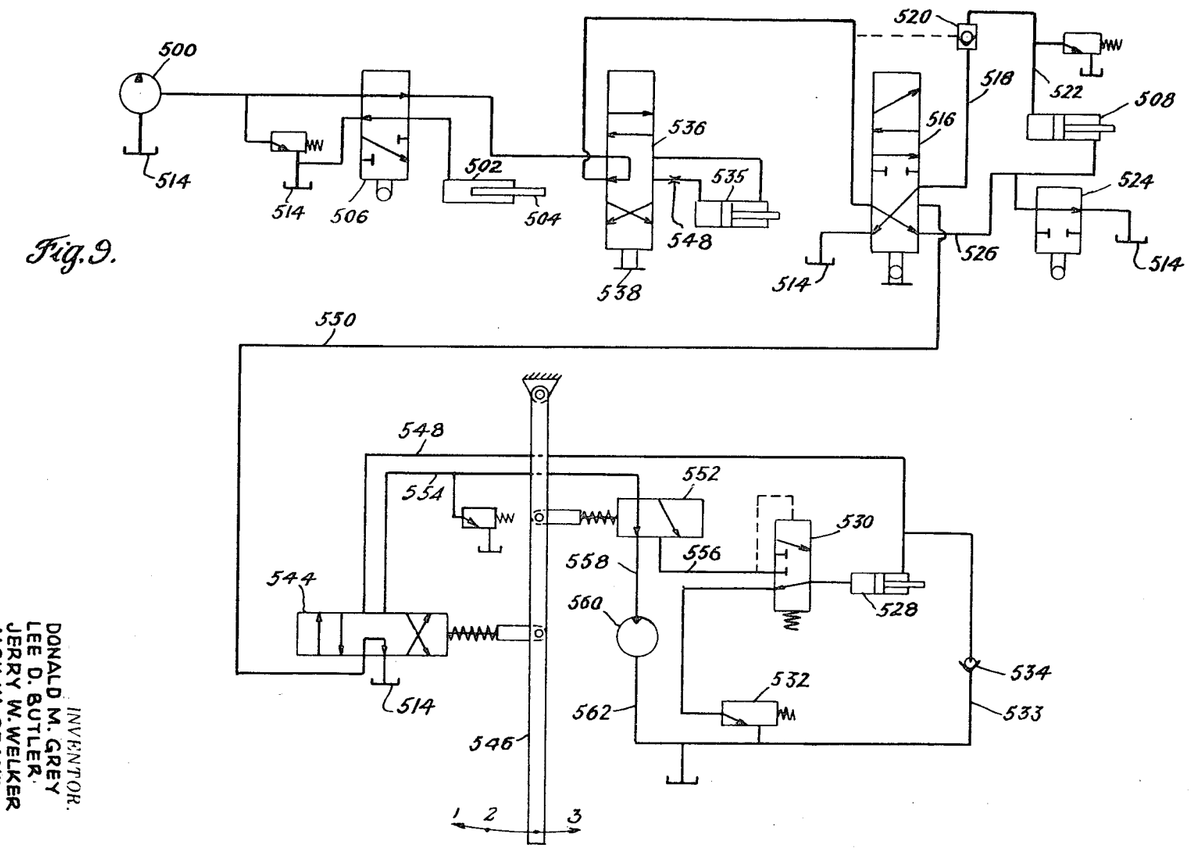
FIG. 9 is a schematic view illustrating the relationship between the various hydraulic components of the bale wagon of this invention.

To retrieve a stack of bales it is first necessary to remove the tines 266 from the cross rod 268. A spiked retrieving bar 230 is then bolted to the forward end of the second transfer table 200. If the rolling rack 300 is not in contact with the forks 296 then it is necessary to shift the rack to that position. This is accomplished by first shifting the spool of valve 516 to its intermediate position, this being accomplished to control 540 at the forward end of the machine, the control 540 being operatively interconnected with the valve 516 by means of a push-pull control rod 542 (FIG. 2A). When the second table cylinder control valve 516 is in its intermediate position and the valves 506 and 536 for the first table cylinder and third table or load rack cylinder, respectively, are in their normal positions, as shown in FIG. 9, fluid from the pump 500 will be directed through line 550 to a manually operated control valve 544. When the valve is in its normal intermediate position, as shown in FIG. 9, the fluid would be directed back to reservoir 514, When it is desired to move the rolling rack to its extreme rearward position the valve control lever 546 is moved forwardly shifting the spool within the valve 544 in the forward direction so that fluid from the pump 500 is then directed through fluid line 548 to the rod end of the rolling rack cylinder 528, causing the rack to be moved to the rear end of the load rack. Upon attainment of the rearmost position of the rolling rack the lever 546 is returned to its normal position, shown in FIG. 9, and the load rack cylinder control valve 536 is shifted manually through control 538 to cause fluid to be directed into the anchor end of the cylinder extending the cylinder and causing the load rack to assume a vertical position as illustrated in FIG. 10. The wagon is then backed into the stack of bales with the forks 296, 302 underlying the stack. The second table cylinder control valve 516 is then shifted manually through control 540 to cause the second table cylinder 508 to extend which will in turn cause the second table to engage the top of the stack with the spiked retrieving bar being dug into the uppermost layer of bales as illustrated in FIG. 10. A rope, or cable, 265 is then disposed about the bales, the ends of the cable being fixed to the lower ends of the struts 264. The load rack is then lowered, the fluid within the anchor end of the cylinders 535 being discharged through a restrictor valve 548 which limits the rate of descent of the load rack.

SINGLE BALE UNLOADING OPERATION

To single-bale unload from a stack of bales carried on the load bed in a manner indicated in FIG. 11 it is first necessary to position the second table in its single-bale unloading position, this position being illustrated in FIG. 12. To attain this position it is only necessary to operate the second cylinder control valve 516 manually to place the table in the intermediate position illustrated in FIG. 12 at which time the second table support is placed under the forward end of table. The second table support, indicated generally at 232, is best illustrated in FIGS. 1A and 2A and consists essentially of two spaced-apart vertically extending pipes 234 having saddles 236 fixed to their upper ends. A generally U-shaped member 238 interconnects the pipes 234, the bight portion of the U-shaped member 238 being disposed above and forwardly of the saddles 236. The second table support 232 is normally stored on the forward end of the chassis as indicated in FIGS. 1A and 2A, the lower end of the pipe being disposed about vertical pine 239 which are carried by lugs 240 which extend to the other side of the frame members 14, 16. When the second table support 232 is placed in its table supporting position the lower ends of the pipes 234 are disposed about pins 242 carried by the frame member 214. In this position the saddles 236 will be engaged by the forward transverse frame member 211 of the second table.

After the second table has been placed in an inclined unloading position as illustrated in FIG. 12 the second table cylinder control valve 516 is placed in its intermediate position. Fluid under pressure from pump 500 will then flow through valves 506, 536, and 516, and power out line 550 to control valve 544. It is then necessary to advance the rolling rack 300 to deposit a tier of bales on the second table 200. This is accomplished by extending the rolling rack cylinder 528 which will cause the midportion of cable 342 to move forwardly. The cylinder 528 is controlled through control lever 546 and the various valves 544, 552, and 530. When the control lever 546 is shifted all the way to the rear, the spools in valves 544 and 552 will likewise be shifted to the rear causing fluid under pressure to flow from the control valve 544 through line 554 and valve 552 into line 556. This will cause the shuttle valve 530 to be shifted from its normal position, illustrated in FIG. 9, to a position where the fluid may then flow through the valve 530 from line 556 into the anchor end of the rolling rack cylinder 528. As the rolling rack is advanced the foremost tier of the stack will pass over the box beam member 298 and fall onto the second transfer table 200.

The U-shaped member 238 on the support 232 will prevent any bales on the top layer from inadvertently falling over the forward edge of the second table onto the first table. As soon as a tier of bales has fallen onto the transfer table the rolling rack is stopped and the motor 560 which drives the cross conveyor 350 and the bale engaging means 352 is started. This is accomplished by shifting the lever 546 to an intermediate rear position. This causes the spool within valve 552 to be shifted to its normal forward position illustrated in FIG. 9 while the spool within valve 544 is maintained in its rearward position. Fluid will now flow from line 554 through valve 552 into line 558 and then to the rotary hydraulic motor 560, the oil being discharged from the motor 560 through line 562 into reservoir 514. The motor 560 has an output shaft 564 which is connected in driving relationship to the sprocket 355. As noted before rotation of the sprocket 355 will cause bales to be contacted by the paddles 358 and discharged to the right of the machine.

When the machine is operated the tiers of bales are transferred onto the second table only when the paddles 258 are in the position illustrated in FIG. 3. In this position the bale hooks 362 are disposed below the bale hook openings 363 as the arm 374 has been released by the latch 382 immediately prior to the attainment of the position shown in FIG. 3. As the motor 560 starts to rotate the lower flight of the cross conveyor chain 354 will be moved to the left of the machine carrying the conveyor engaging assembly 394 in that direction, in turn causing the rock shaft 364 to rotate in such a manner that the hooks 362 will be projected upwardly through the slots 363 so that they engage the layer of bales immediately above the lowest layer, the engaged layer of bales then being shifted upwardly to the position indicated in FIG. 12. This shifting movement will take place before the paddle 358 on the left-hand side of the machine will engage the left-hand end of the lowest layer of bales. Continued rotation of the motor 560 will cause the lowest layer of bales to be discharged to the right over the extension portion 244 of the second table. After the lowest layer of bales has been discharged the other paddle 358 on the conveyor 354 will contact the trip arm 386 causing the latch 382 to be disengaged from the conveyor engaging assembly, permitting the swingable arm to be swung to the right by the action of the spring 384, lowering the hooks beneath the slots in the table to permit the next lowest layer of bales to assume the lowest position. Continued movement of the chain will then cause the hooks to swing upwardly engaging the next layer of bales and the paddle, which has just engaged the trip arm 286, to then engage the left-hand end of bales ready for discharge. After the last layer of bales has been discharged from the tier of bales deposited upon the second table the rolling rack is then advanced forwardly to deposit another tier of bales upon the second table and then the discharge procedure set forth above is repeated.

Figure 6:
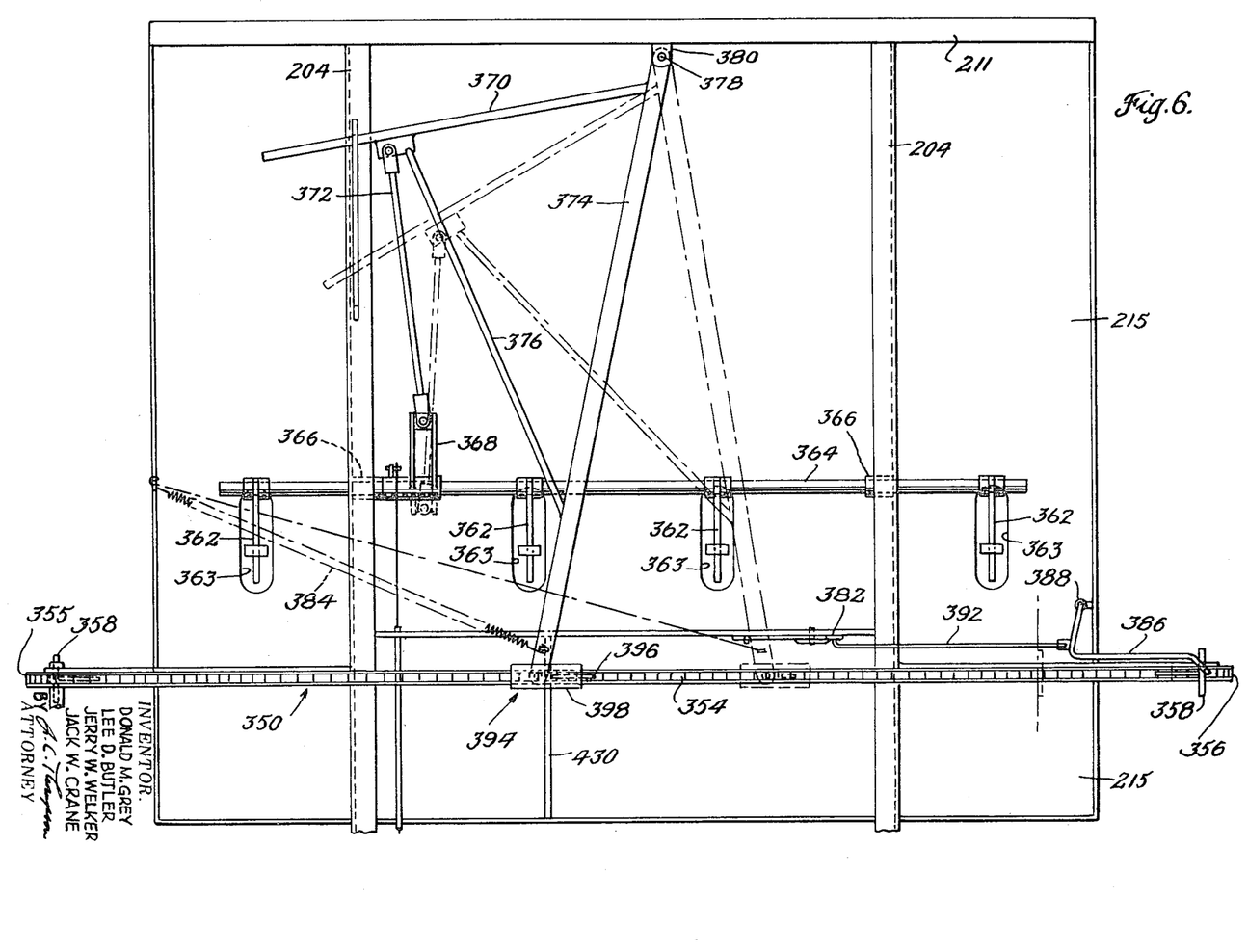
FIG. 6 is a view of the underside of the second table illustrating a portion of the cross conveyor and the bale-holding means.

Means are provided to insure that the rolling rack cannot be advanced toward the forward end of the bale wagon except when the hooks are in their lowered position illustrated in FIGS. 2A and 6. In this connection it should be observed that the motor which drives the conveyor chain 354 and the rolling rack cylinder 528 cannot be driven at the same time, the valve directing fluid from line 554 either to cylinder 528 or to motor 560. When the lever 546 is in its intermediate rear position (2 in FIG. 9) the motor 560 will be driven. When the lever is shifted all the way to the rear (1 in FIG. 9) the valve spool of valve 552 will shift to the rear only if the hooks are in their lowered position. A latch, shown schematically at 432, holds the valve 552 in its forward position, except when released by cable control 434. The forward end of the cable control 434 is connected to one side of the rock shaft 364. The control cable will release the latch only when the rock shaft 364 has been rotated to its full extent in the counterclockwise direction (illustrated in FIG. 2A), the hooks then being disposed below the surface of the table 200. Once the latch releases the valve permitting it to shift to the rear the conveyor will stop in the position shown in FIG. 3.

While a preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:
1. A bale wagon comprising in combination:
   a chassis;
   tier forming means mounted on said chassis adapted to receive bales and to assemble said bales into tiers such that each tier includes a plurality of layers;

a load rack mounted on said chassis and adapted to support a stack comprised of a plurality of tiers disposed in side-by-side relationship, said load rack being further adapted to deposit the entire stack on the ground;

means for transferring individual tiers formed on said tier forming means to said load rack;

means cooperative with said load rack for retrieving stacks from the ground;

means for selectively moving each individual tier of said stack from said load rack to said tier forming means; and means on the wagon and associated with said tier forming means for unloading a complete tier from the tier forming means one bale at a time.

2. The bale wagon as set forth in claim 1 wherein said tier forming means includes first and second transfer tables arranged in tandem.

3. A bale wagon, comprising in combination:

a chassis;

a stack carrying load rack pivotally mounted about a transverse axis on said chassis and adapted to pivot from a generally normal horizontal transport position to a generally vertical position for depositing or retrieving a stack;

a transfer table pivotally mounted transversely the front end of said load rack and movable thereabout from a first generally horizontal position to a second generally vertical position relative to said load rack, said transfer table being adapted to receive bales in said first position and assemble them into tiers having a plurality of layers and to move to said second position for depositing said tiers on said load rack, said transfer table being further cooperative to coact with said load rack for retrieving stacks;

means for moving individual tiers of the stack from said load rack to said transfer table;

means cooperative with said transfer table for separating a layer from said tier; and conveying means associated with said transfer table for conveying the bales of said separated layer therefrom one bale at a time.

4. A bale wagon comprising in combination:

a chassis;

tier forming means mounted on said chassis adapted to receive bales and to assemble said bales into tiers such that each tier includes a plurality of layers, said tier forming means including first and second transfer tables arranged in tandem;

a load rack mounted on said chassis and adapted to support a stack comprised of a plurality of tiers disposed in side-by-side relationship, said load rack being further adapted to deposit the entire stack on the ground;

means for transferring individual tiers formed on said tier forming means to said load rack;

means cooperative with said load rack for retrieving stacks from the ground;

means for selectively moving each individual tier of said stack from said load rack to said tier forming means; and means associated with said tier forming means for unloading individual bales of the stack one bale at a time, said unloading means comprising bale engaging means adapted to engage a portion of a tier and separate that portion from a second portion of the same tier, and a cross conveyor for conveying said second tier portion from the bale wagon.

* * * * *